Oct. 9, 1962 A. S. WALSH ET AL 3,058,071

ELECTROMAGNETIC WAVE SWITCHING SYSTEMS

Filed Jan. 10, 1961 3 Sheets-Sheet 1

INVENTORS
ARTHUR STEPHEN WALSH
KENNETH BRIAN WHITING
BY Kirschstein, Kirschstein + Ottinger
ATTORNEYS INVENTORS
ARTHUR STEPHEN WALSH
KENNETH BRIAN WHITING
BY Kirschstein, Kirschstein & Ottinger
ATTORNEYS Oct. 9, 1962 A. S. WALSH ET AL 3,058,071

ELECTROMAGNETIC WAVE SWITCHING SYSTEMS

Filed Jan. 10, 1961 3 Sheets-Sheet 3

INVENTORS
ARTHUR STEPHEN WALSH
KENNETH BRIAN WHITING
BY Kirschstein, Kirschstein & Ottinger
ATTORNEYS United States Patent Office 3,058,071

Patented Oct. 9, 1962

3,058,071

ELECTROMAGNETIC WAVE SWITCHING SYSTEMS

Arthur Stephen Walsh, Watford, and Kenneth Brian Whiting, Hendon, London, England, assignors to The General Electric Company Limited, London, England Filed Jan. 10, 1961, Ser. No. 81,360
Claims priority, application Great Britain Jan. 14, 1960
9 Claims. (Cl. 333—11)

Figure 1:
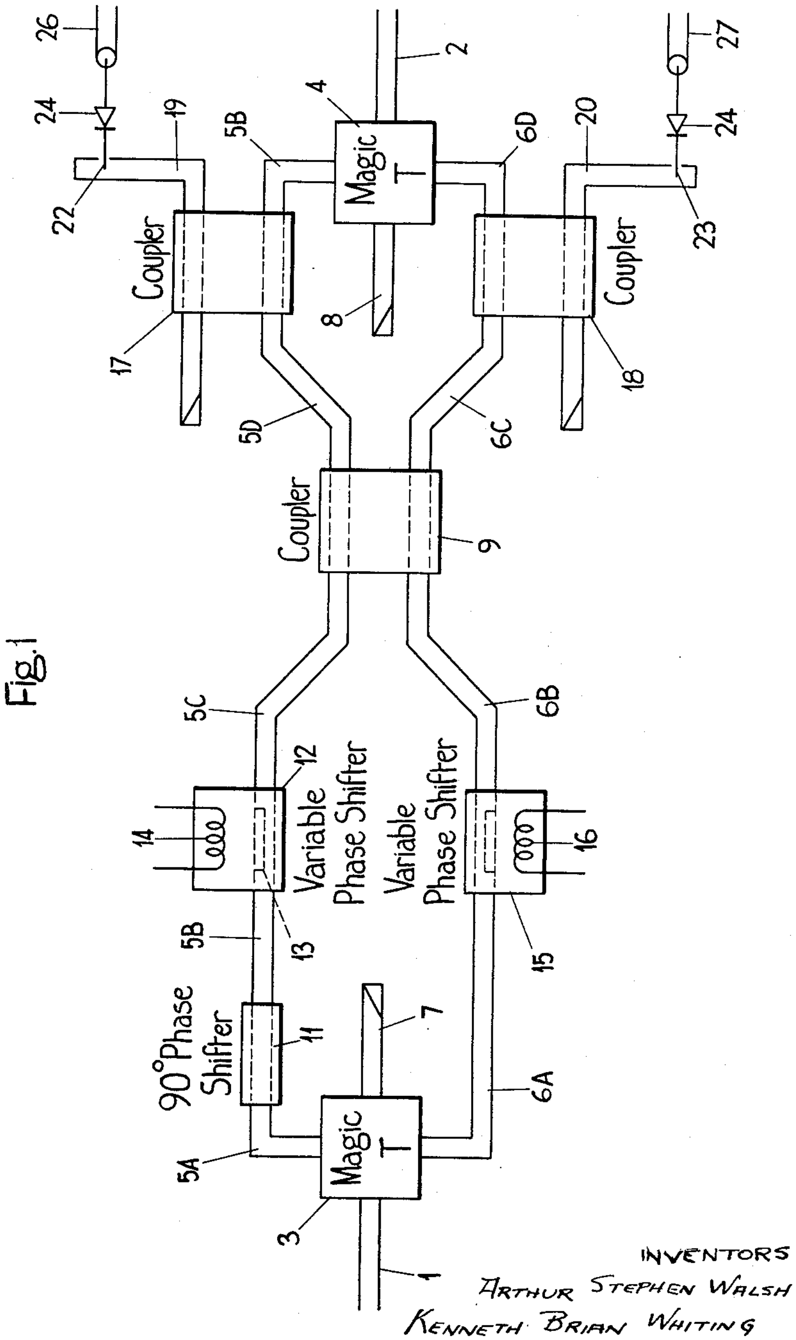

This invention relates to electromagnetic wave switching systems.

According to the present invention, an electromagnetic wave switching system comprises two transmission paths, first means which is arranged to divide substantially equally between the two paths the energy of an electromagnetic wave supplied over an input path, two phase shifting devices which are connected in said two paths respectively and each of which is arranged to introduce a phase shift that is dependent upon an electric control signal supplied thereto, second means which is arranged to combine the waves passed thereto over said two transmission paths, if those waves are suitably phased, and to pass them to an output path, and control means to supply electric control signals to said phase shifting devices in dependence upon the waves supplied over one or both of said transmission paths to the second means or upon waves supplied by the second means, said control means being arranged to operate selectively in either of two conditions and the arrangement being such that the phase shifting devices are controlled so that waves on the input path are passed to the output path when said control means is operating in one condition while substantially no such waves are passed to the output path when said control means is operating in its other condition.

According to a feature of the present invention, an electromagnetic wave switching system comprises two transmission paths, first means which is arranged to divide substantially equally between the two paths the energy of an electromagnetic wave supplied over an input path, a coupler which is associated with the two transmission paths and which is arranged to divide substantially equally between the two paths the energy of an electromagnetic wave fed to the coupler along either path, this coupler being of the kind in which the wave coupled from either path to the other is effectively subjected to a phase shift of substantially 90°, two phase shifting devices which are connected in said two paths respectively between the first means and said coupler and each of which is arranged to introduce a phase shift that is dependent upon an electric control signal supplied thereto, second means which is arranged to combine the waves passed thereto by the coupler over the two transmission paths, if those waves are suitably phased, and to pass them to an output path, and control means to supply electric control signals to said phase shifting devices in dependence upon the amplitudes of the waves supplied over said transmission paths to the second means, said control means being arranged to operate selectively in either of two conditions and the arrangement being such that the phase shifting devices are controlled so that waves on the input path are passed to the output path when said control means is operating in one condition while substantially no such waves are passed to the output path when said control means is operating in its other condition.

The two transmission paths may both be formed by waveguide, preferably of rectangular cross-section, and the phase shifting devices may then each comprise a section of waveguide which contains ferromagnetic ceramic material and a coil which is arranged so that any variation in the steady current carried thereby affects the magnetic field in which said ferromagnetic ceramic material lies and thus controls the phase shift provided by the device. The first means may be a magic T waveguide junction and, in that case a device may be connected in series with one of the phase shifting devices in one of the waveguides between that junction and said coupler to introduce a phase shift of 90°. The second means may also be a magic T waveguide junction.

Figure 2:
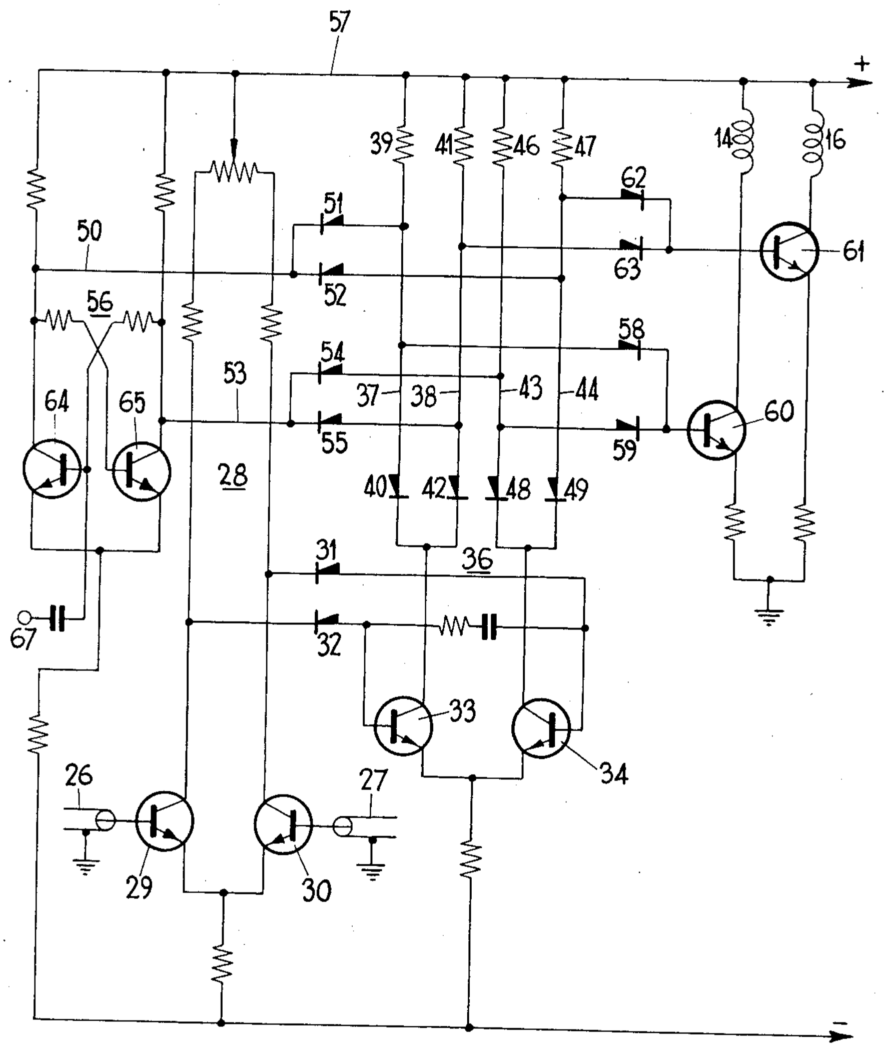
Figure 3:
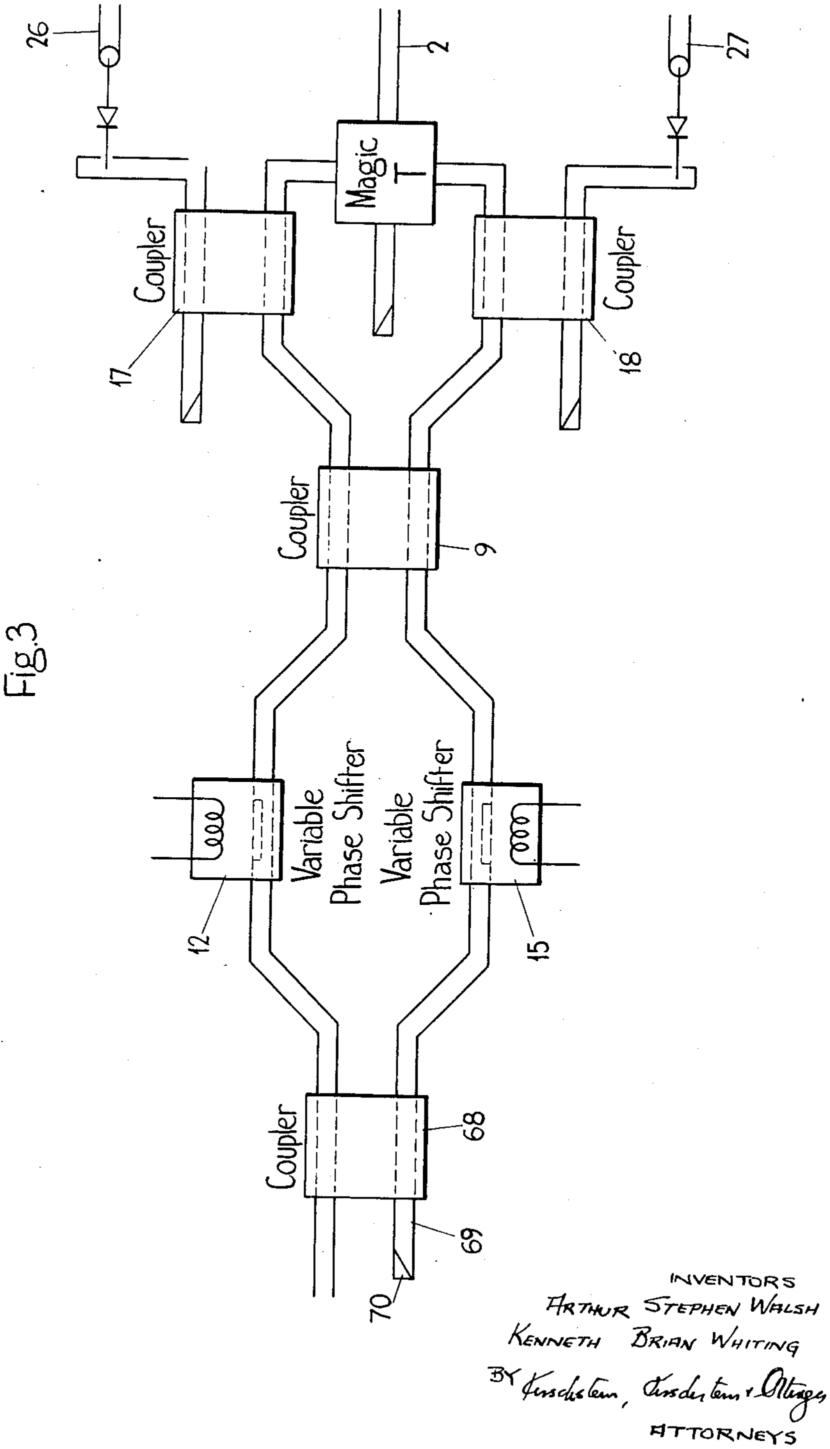

Examples of electromagnetic wave switching systems in accordance with the present invention will now be described with reference to the accompanying drawings in which:

FIGURE 1 shows diagrammatically the waveguide arrangement of one switching system, FIGURE 2 shows a control circuit that is associated with the waveguide arrangement of FIGURE 1 and, FIGURE 3 shows the waveguide arrangement of a second switching system.

Referring now to FIGURE 1 of the accompanying drawings, the first switching system now to be described is arranged selectively to provide a connection between an input waveguide 1 and an output waveguide 2. The system comprises two magic T waveguide junctions 3 and 4 and two waveguides 5 and 6, different portions of the waveguide 5 being referenced with the addition of suffix letters A to E and different portions of the waveguide 6 being referenced with the addition of suffix letters A to D. At the present time the two magic T junctions 3 and 4 will be assumed to be of conventional form with two colinear arms, an E-plane arm and an H-plane arm although as will subsequently be described it is convenient to use a modified form of magic T junction. The H-plane arm of the magic T junction 3 constitutes the input waveguide 1 while the E-plane arm of that junction is terminated by a matched load 7. Similarly the H-plane arm of the magic T junction 4 constitutes the output waveguide 2 while the E-plane arm of that junction has a matched load 8. The two waveguides 5 and 6 provide connections between the other two arms of the magic T junction 3 on the one hand and the other two arms of the magic T junction 4 on the other hand. The input and output waveguides 1 and 2 and the two waveguides 5 and 6 are all of rectangular cross-section.

A so-called "3 db coupler" 9 is provided between the waveguides 5 and 6, this coupler dividing substantially equally between the two waveguides 5 and 6 the energy of an electromagnetic wave supplied thereto over either waveguide while the wave coupled from either waveguide to the other is effectively subjected to a phase shift of 90°. A device 11 for effecting a phase shift of approximately 90° and a variable phase shifting device 12 are connected in the waveguide 5 between the junction 3 and the coupler 9. The device 11 may be formed by a slab of solid dielectric material mounted within the waveguide 5 although, as will be apparent hereinafter other forms of phase shifting device may be employed.

The variable phase shifting device 12 comprises a slab 13 of suitable ferrite material secured to a narrow wall of the waveguide 5, the ferrite material being for example magnesium manganese ferrite. An electromagnet having an operating coil 14 is associated with the ferrite slab 13, the arrangement being such that when the coil 14 is energised the ferrite slab 13 lies in a steady magnetic field that extends transversely across the waveguide 5. As is well known, the magnitude of the current carried by coil 14 determines the phase shift introduced by the variable phase shifting device 12 and in the present arrangement this phase shift is required to be varied between zero and 90°.

A second variable phase shifting device 15, which is identical to the device 12 described above, is provided in the waveguide 6 between the magic T junction 3 and the coupler 9.

Two directional couplers 17 and 18 are arranged to pass to waveguides 19 and 20 small fractions of the waves supplied over waveguide portions 5D and 6C respectively. Each of the waveguides 19 and 20 has the probe 22 or 23 projecting into it and each of these probes 22 and 23 has an associated rectifier 24 or 25. The unidirectional signals supplied by these two rectifiers 24 and 25 over coaxial lines 26 and 27 are thus proportional to the amplitudes of the waves supplied by the two waveguide portions 5E and 6D to the magic T junction 4 and are compared for the purpose of controlling the currents supplied to the coils 14 and 16 of the phase shifting devices 13 and 15.

Referring now to FIGURE 2, the signals fed over the lines 26 and 27 are passed to a differential amplifier 28 which includes two n-p-n transistors 29 and 30.

The voltage developed at the collector electrodes of the transistors 29 and 30 are passed by way of two crystal diodes 31 and 32 to the base electrodes of two further n-p-n transistors 33 and 34 which are also connected to form a differential amplifier 36. The collector electrode circuit of the transistor 33 consists of two parallel-connected paths 37 and 38, the path 37 consisting of a resistor 39 connected in series with a crystal diode 40 while the path 38 consists of a resistor 41 connected in series with a crystal diode 42. In similar manner the collector electrode circuit of the transistor 34 is formed by two parallel-connected paths 43 and 44 which contain two resistors 46 and 47 and two crystal diodes 48 and 49.

The arrangement of the amplifier 36 is such that only one of the two parallel-connected paths in the collector electrode circuit of each of the transistors 33 and 34 is operative at any time. For this purpose the paths 37 and 44 are connected to a lead 50 by way of two crystal diodes 51 and 52 respectively and a lead 53 is connected to the two paths 38 and 43 by way of crystal diodes 54 and 55 respectively.

During use of the arrangement, as will be apparent hereinafter, one of the leads 50 and 53 at any time has approximately the voltage of the positive supply line 57 while the other lead has a somewhat lower voltage. Accordingly, under one of these two conditions of voltage on the leads 50 and 53, the crystal diodes 40 and 47 are conducting while the diodes 42 and 48 are cut off so that only the paths 37 and 44 are operative. In the other condition, when the voltages on the leads 50 and 53 are reversed, only the paths 38 and 43 are operative.

The paths 37 and 43 are connected by way of crystal diodes 58 and 59 to the base electrode of a n-p-n transistor 60, this transistor being connected as an amplifier stage with the coil 14 in its collector electrode circuit. Similarly the coil 16 is connected in the collector electrode circuit of a n-p-n transistor 61 which has its base electrode connected to the paths 38 and 44 of the differential amplifier 36 by way of crystal diodes 62 and 63.

In order to understand the manner in which the two variable phase shifting devices 13 and 15 are controlled during operation of the system described above, it is convenient first to consider what would happen if the coils 14 and 16 of both these devices were to be de-energised so that those devices each introduce substantially zero phase shift. Waves supplied to the system over the input waveguide 1 would be equally divided by the magic T junction 3 between the two waveguides 5 and 6, the waves so applied to the two waveguide portions 5A and 6A being in phase. With the same values of phase shift introduced by the two variable phase shifting devices 13 and 15, the waves supplied over the two waveguide portions 5C and 6B to the coupler 9 are in phase quadrature and of equal amplitude provided, as is at present assumed, the attenuation effected by the two waveguides 5 and 6 between the magic T junction 3 and the coupler 9 were the same. Accordingly under these conditions the coupler 7 would supply waves to the magic T junction 4 only over the waveguide 5, there being no waves transmitted over the waveguide portions 6C and 6D. The resultant inequality of the signals supplied by the rectifiers 24 and 25 would cause the two transistors 29 and 30 of the comparison circuit 28 to operate so that the transistor 29 is conducting and the transistor 30 is cut off. This would cause the transistor 34 of the differential coupler 36 to be conducting and the transistor 33 to be non-conducting.

If now it is also assumed that, at this time, the lead 53 has its higher voltage so that the paths 38 and 43 are operative, the effect of the transistor 34 conducting is that the transistor 61 is caused to conduct and thereby energise the coil 16 of the phase shifting device 15. In other words the phase shifting device 15 would be controlled so that it introduces a finite phase shift into the waveguide 6 and this in turn would cause waves to be supplied by the coupler 9 to waveguide portion 6C and thus over waveguide portion 6D to the magic T junction 4. At the same time, the amplitude of the waves supplied to the junction 4 over the waveguide portion 5E is decreased. (It will be appreciated that under the conditions assumed the base electrode of the transistor 60 would be positively biassed so that this transistor is cut off and the coil 14 is de-energised.)

The situation envisaged at the end of the last paragraph is, in fact, the manner in which the system does operate, the arrangement being such that any excess in the amplitude of the waves supplied to the magic T junction 4 over the waveguide 5 as compared with the amplitude of the waves similarly supplied over the waveguide 5 results in current being carried by the coil 16 of the phase shifting device 15. The gain of the amplifiers 28 and 36 is so high that the system is in equilibrium when the phase shifting device 15 introduces a phase shift of approximately 90° under which condition the waves passed over the waveguide portions 5E and 6D to the magic T junction 4 are of substantially equal amplitude and are in phase. It follows that the magic T junction 4 serves to combine these waves and pass them to the output waveguide 2, no waves then being passed to the load 8.

In order to operate the system described above so that waves on the input waveguide 1 are not passed to the output waveguide 2, it is necessary to control the variable phase shifting devices 12 and 15 so that they introduce phase shifts of approximately 90° and zero respectively. For this purpose it is merely necessary effectively to interchange the "connections" between the two rectifiers 24 and 25 and the two coils 14 and 16 of the phase shifting devices 12 and 15. This is done by reversing the voltages on the leads 50 and 53 so that the paths 37 and 44 of the amplifier 36 are then operative. This results in the currents carried by the coils 14 and 16 being controlled so that the phase shifting devices 12 and 14 effect the desired phase shifts. Under these conditions the waves supplied to the magic T junction 4 over the waveguide portions 5E and 6D are again of substantially equal amplitude but in this case they are in anti-phase. Accordingly the magic T junction 4 serves to combine these waves and pass them to the load 8, no waves then being passed to the output waveguide 2.

It will be appreciated that with one of said two conditions of voltage on the leads 50 and 53, input waves supplied over the waveguide 1 are passed to the output waveguide 2 while with the other condition of voltages on the leads 50 and 53 waves supplied over the waveguide 1 are passed to the load 8. The leads 50 and 53 are in fact connected to the collector electrodes of two transistors 64 and 65 which are connected in a switching circuit 56. The switching circuit 56 is arranged so that at any time one of the transistors 64 and 65 is conducting while the other is cut off, the particular one of the transistors 64 and 65 that is conducting at any time being dependent upon the voltage supplied to an input terminal 67. In one example, a signal consisting of a train of regularly recurrent impulses is supplied to this terminal 67, with the result that waves supplied over the input waveguide 1 are only passed to the output waveguide 2 in every alternate interval.

The example of switching system described above may be changed by using, in place of the magic T junctions 3 and 4, a somewhat modified form of magic T junction in which the two co-linear arms thereof are effectively bent through 90° so that they lie parallel to one another. The two waveguides 5 and 6 may then conveniently both be straight lengths of waveguide with a so-called "narrow wall coupler" between the two waveguides to constitute the coupler 9. In another modified arrangement, the phase shift device 11 may be provided by a section of waveguide which is of somewhat larger rectangular cross-section than the waveguides 5 and 6. In order that the switching system may operate over a fairly broad band of frequencies it is then desirable for the physical length of the waveguide portions 5A, 5B and 5C together with the section of waveguide constituting the device 11 to be a little greater than that of the waveguide portions 6A and 6B and this may be arranged by bending in the same place, but with different radii of curvature, the waveguide runs between the magic T junction 3 and the coupler 9 so that they are still generally parallel to one another.

The 90° phase shifting device 11 may, of course, be dispensed with if the magic T junction 3 has suitable asymmetry to supply appropriately phased waves.

Furthermore, as shown in FIGURE 3, the magic T junction 3 (FIGURE 1) and the 90° phase shifting device 11 may be replaced by a "3 db coupler" 68 of the "narrow wall" kind, the arm 69 of this coupler which neither constitutes the input waveguide 1 nor is connected to one of the variable phase shifting devices being provided with a matched load 70. The rest of the switching system of FIGURE 3 is the same as that of FIGURE 1 and corresponding items in the two figures have the same references. In this case however, the system effectively provides a connection between the input waveguide 1 and the output waveguide 2 when the phase shift devices 12 and 15 are controlled (by means of the circuit of FIGURE 2) so that they introduce phase shifts of 90° and zero respectively while there is no such connection when these phase shifts are interchanged.

The switching system which is described above with reference to FIGURES 1 and 2 may also be modified by omitting the coupler 9. In this case one, or each, of the variable phase shifting devices 12 and 15 is modified by the provision of an auxiliary coil which is arranged to be energised by alternating current so that the steady magnetic field in which lies the ferrite slab of the appropriate phase shifting device has an oscillatory component superimposed on it during operation of the system. Furthermore the two directional couplers 17 and 18 instead of being associated with the portions of the waveguides 5 and 6 are associated with the H-plane arm and the E-plane arm of the magic T junction 4 respectively. During operation of this modified system the signal supplied by the rectifier fed from one of the directional couplers is passed via an alternating current amplifier to a phase sensitive detector where the phase of the oscillatory component of that signal is compared with the phase of said alternating current. The direct current output signal of this detector is amplified and used to control the two variable phase shifting devices 12 and 15 so that one device provides zero phase shift and the other provides a phase shift of 90°, as previously, whereby the amplitude of said oscillatory component tends to be reduced. Due to the high gain of the feedback loop, the effect of this is to reduce to a minimum the amplitude of the waves passed over that arm of the magic T junction 4 with which the rectifier and directional coupler under consideration are associated with the result that most of the input energy is supplied to the other arm of that junction. In order to switch the system between its two operating conditions, it is only necessary to change over the directional coupler and rectifier from which the input signal of said phase sensitive detector is obtained.

The arrangement described in the last paragraph may be further modified by replacing the magic T junction 4 by a "3 db coupler" of the "narrow wall" kind and in that case the 90° phase shifting device 11 is not required.

It is to be understood that the invention is not restricted to switching systems in which servo control of the operation of the phase shifting devices 12 and 15, say, is effective for both operating conditions. For example with the system of FIGURE 1, the control circuit of FIGURE 2 may be modified so that, although the system operates in the manner hereinbefore described in the condition in which waves supplied over the input waveguide 1 are passed to the load 8 (at the same time providing a high attenuation between the waveguides 1 and 2), in the other condition the currents carried by the coils 14 and 16 have substantially predetermined values (that are not dependent upon the signals supplied by the rectifiers 24) so that waves supplied over the waveguide 1 are then passed to the output waveguide 2.

We claim:

1. An electromagnetic wave switching system comprising (*a*) an input path, (*b*) two transmission paths, (*c*) first means which is arranged to divide substantially equally between the two paths the energy of an electromagnetic wave supplied over the input path, (*d*) a coupler which is associated with the two transmission paths and which is arranged to divide substantially equally between the two paths the energy of an electromagnetic wave fed to the coupler along either path, (*e*) an output path, (*f*) two phase shifting devices which are connected in the two transmission paths respectively between the first means and said coupler and each of which is arranged to introduce a phase shift that is dependent upon an electric control signal supplied thereto, (*g*) second means which is arranged to combine the waves passed thereto by the coupler over the two transmission paths, if those waves are suitably phased, and to pass them to the output path, (*h*) control means which is selectively operable in either of two conditions and which supplies electric control signals to said phase shifting devices in dependence upon the amplitude of waves supplied by the two transmission paths to the second means (*i*) so that the phase shifting devices are controlled to cause waves on the input path to be passed to the output path when said control means is operating in one condition and to be controlled so that no such waves are passed to the output path when said control means is operating in its other condition, and (*j*) means to switch the control means from either of its operating conditions to the other.

2. An electromagnetic wave switching system according to claim 1 wherein the coupler is of the kind in which the wave coupled from either path to the other is effectively subjected to a phase shift of substantially 90°.

3. An electromagnetic wave switching system according to claim 1 wherein the two transmission paths are each formed by a waveguide.

4. An electromagnetic wave switching system according to claim 3 wherein each of the phase shifting devices comprises a section of waveguide which contains ferromagnetic ceramic material and a coil which is arranged so that any variation in the steady current carried thereby affects the magnetic field in which said ferromagnetic ceramic material lies and thus controls the phase shift provided by the device.

5. An electromagnetic wave switching system according to claim 3 wherein the first means is a magic T waveguide junction.

6. An electromagnetic wave switching system according to claim 5 wherein the coupler is of the kind in which the wave coupled from either path to the other is effectively subjected to a phase shift of substantially 90° and wherein a device is connected in series with one of the phase shifting devices in one of the waveguides between that junction and said coupler to introduce a phase shift of 90°.

7. An electromagnetic wave switching system according to claim 3 wherein the first means is a coupler of the kind which is arranged to subject the wave supplied to one of the waveguides to a phase shift of 90°.

8. An electromagnetic wave switching system according to claim 3 wherein the second means is a magic T waveguide junction.

9. An electromagnetic wave switching system according to claim 1 wherein, for the purpose of deriving the control signals supplied to said phase shifting devices, there are two means arranged respectively to supply two unidirectional electric signals the amplitudes of which give a measure of the amplitudes of the waves supplied respectively over the two transmission paths to said second means and a differencing circuit to which said two unidirectional electric signals are supplied.

References Cited in the file of this patent

UNITED STATES PATENTS

| | | |
|---|---|---|
| 2,593,120 | Dicke | Apr. 15, 1952 |
| 2,905,902 | Strandberg | Sept. 22, 1959 |
| 2,951,996 | Pan | Sept. 6, 1960 |